United States Patent [19]

Watanabe et al.

[11] Patent Number: 5,127,074
[45] Date of Patent: Jun. 30, 1992

[54] METHOD OF FABRICATING AN OPTICAL PACKAGE

[75] Inventors: Hideki Watanabe; Yuji Sakazaki; Akinobu Suzuki, all of Kanagawa, Japan

[73] Assignee: Mitsubishi Denki Kabushiki Kaisha, Japan

[21] Appl. No.: 651,757

[22] Filed: Feb. 7, 1991

[30] Foreign Application Priority Data

Feb. 8, 1990 [JP] Japan .................................. 2-28771

[51] Int. Cl.$^5$ .............................................. G02B 6/32
[52] U.S. Cl. ........................................ 385/93; 385/34
[58] Field of Search ............ 350/96.15, 96.18, 96.20, 350/96.21, 320; 357/74; 385/34, 88, 90, 91, 92, 93

[56] References Cited

U.S. PATENT DOCUMENTS

| | | | |
|---|---|---|---|
| H551 | 12/1988 | Chaoui et al. | 350/96.20 |
| 4,779,947 | 10/1988 | Ito | 350/96.20 |
| 4,790,618 | 12/1988 | Abe | 350/96.15 |
| 4,803,689 | 2/1989 | Shibanuma | 350/96.20 X |
| 4,834,491 | 5/1989 | Aoki et al. | 350/96.20 |
| 4,875,752 | 10/1989 | Suzuki | 350/96.20 |

FOREIGN PATENT DOCUMENTS

| | | |
|---|---|---|
| 0241955 | 10/1987 | European Pat. Off. . |
| 0278507 | 8/1988 | European Pat. Off. . |
| 0345874 | 12/1989 | European Pat. Off. . |
| 240450 | 10/1986 | Fed. Rep. of Germany . |
| 63-18164 | 4/1988 | Japan . |
| 2015766 | 9/1979 | United Kingdom . |

*Primary Examiner*—John D. Lee
*Attorney, Agent, or Firm*—Wolf, Greenfield & Sacks

[57] ABSTRACT

An optical package includes a housing composed of two sections, a first section and a second section connectable to the first section. A laser holder is connected to the first section of the housing and adapted to hold a laser assembly. A fiber holder is connected to the second section of the housing and includes a ferrule by which an optical fiber is held. A rod lens is mounted within the housing to focus optical emission from the laser assembly on the optical fiber. The laser assembly includes a semiconductor element. Radial alignment of the semiconductor element and the laser holder is performed before the laser holder is secured to the first section of the housing. Axial alignment of the rod lens and the semiconductor element takes place while the laser holder is being fit in the first section of the housing. The second section of the housing is then moved in a radial direction relative to the optical axis of the semiconductor element and is, then, laser welded to the first section of the housing.

14 Claims, 3 Drawing Sheets

METHOD OF FABRICATING AN OPTICAL PACKAGE

BACKGROUND OF THE INVENTION

1. Field of the Invention

This invention relates to a method of fabricating an optical package for use in an optical transmission system.

2. Prior Art

In the field of optoelectronics, optical packages have been the subject of much study, especially methods of precisely attaching and aligning an optical fiber to a semiconductor laser or other active optical components. Coupling between an optical fiber and a semiconductor laser requires a high degree of care in fabrication, particularly when an optical package is designed for a high frequency, single mode transmission system. Direct attachment of an optical fiber to a semiconductor laser can be disrupted when the operating temperature of the semiconductor laser fluctuates and causes different dimensional changes respectively in the optical fiber and the semiconductor laser. The dimensional changes in response to temperature fluctuation cause the optical fiber to become separated from the semiconductor laser. In addition, direct coupling is generally inefficient because of a wide disparity in the dimensions of the guided modes in the semiconductor laser and the optical fiber. This can be overcome by the use of a lens for mode size matching.

A copending U.S. patent application Ser. No. 546,381 (now U.S. Pat. No. 5,073,047) discloses an optical package or module designed for a high frequency, single mode transmission system. The optical package generally comprises a housing, a laser holder by which a semiconductor laser is held, and a fiber holder including a ferrule by which an optical fiber is held. The housing is composed of two sections welded together. A first section of the housing has a rod lens for focusing optical emission from the semiconductor laser on the optical fiber. The other section of the housing has a bore to receive the ferrule. The laser holder and the fiber holder are attached to the first and second sections of the housing, respectively. It should be understood that when the laser assembly is fit in the laser holder, the optical axis of a semiconductor element or chip may not precisely be aligned with the central axis of the laser holder. This is due to the fact that such a semiconductor chip is occasionally not precisely positioned as it should be, because, mainly, of manufacturing tolerance. In the case that the optical axis of the semiconductor chip is offset from the central axis of the laser holder after it has been assembled to the laser holder, then such an offset increases under the influence of the rod lens. Accordingly, the second section of the housing is moved in a radial direction relative to the optical axis of the laser until maximum optical output is attained. However, this adjustment is often time-consuming.

SUMMARY OF THE INVENTION

Accordingly, it is an object of the present invention to provide a method of fabricating an optical package which can reduce the time required to align an active optical component with an optical fiber.

According to one aspect of the present invention, there is provided a method of fabricating an optical package. The optical package generally includes a housing, a laser holder coupled to one end of the housing and adapted to hold a laser assembly, and a fiber holder secured to the other end of the housing and adapted to hold an optical fiber. A rod lens is mounted within the housing to focus optical emission from a semiconductor element on the optical fiber. In a preferred embodiment, the laser assembly is moved relative to the laser holder in a radial direction relative to the optical axis of the optical fiber to align the optical axis of the semiconductor element with the central axis of the laser holder. This facilitates subsequent radial alignment of the semiconductor element and the optical fiber. The laser holder is then fit in the housing to perfect axial alignment of the semiconductor element and the rod lens. The laser holder is laser welded to the housing. The housing has a first section in which the rod lens is inserted in place, and a second section within which the optical fiber is received. After axial alignment has been completed, the second section of the housing is moved to the first section in a radial direction relative to the optical axis of the semiconductor element to maximize output. In a preferred embodiment, the first section and the second section of the housing are laser welded together.

According to another aspect of the present invention, an optical package comprises a housing, and a laser holder coupled to the housing and including a rod lens. After a laser assembly is mounted to the laser holder, the rod lens is inserted into the laser holder until a predetermined spacing between the rod lens and a semiconductor element is attained. In this embodiment, the rod lens and the semi-conductor element are both assembled to the laser holder and axially aligned with one another before the laser holder is laser welded to the housing. As such, axial alignment of the semiconductor element and the rod lens will in no way deteriorate during a subsequent laser welding process.

BRIEF DESCRIPTION OF THE DRAWINGS

A better understanding of the present invention may be had by reference to the following description of preferred embodiments when taken in conjunction with the accompanying drawings, in which.

DETAILED DESCRIPTION OF THE PREFERRED EMBODIMENTS

Figure 1:
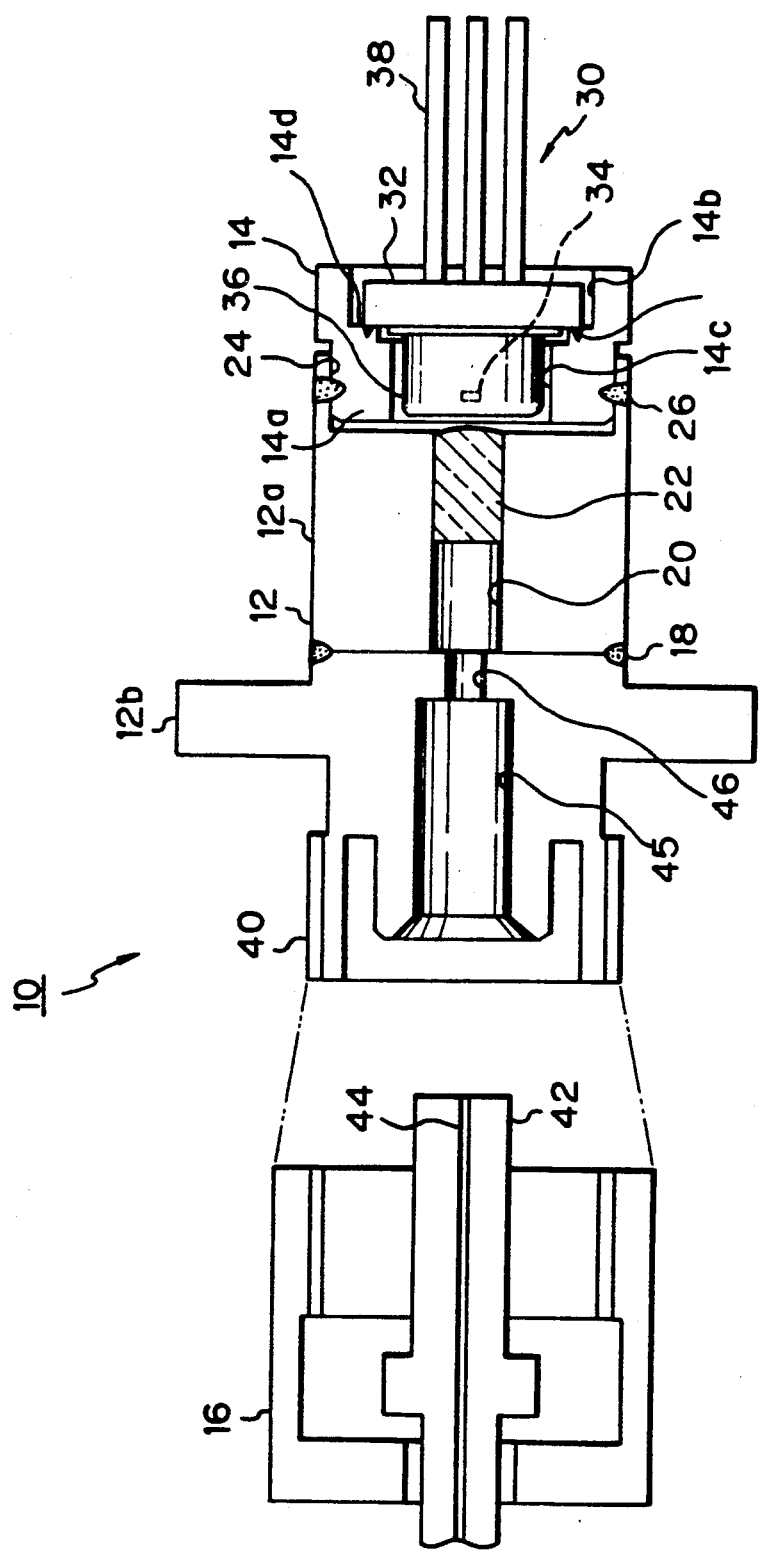
FIG. 1 is a longitudinal sectional view of an optical package fabricated according to one embodiment of the present invention.

Referring now to FIG. 1, there is illustrated an optical package fabricated according to one embodiment of the present invention and generally indicated by the reference numeral 10. The optical package 10 generally includes a housing 12, a laser holder 14 coupled to one end of the housing 12, and a fiber holder 16 secured to the other end of the housing 12.

Specifically, the housing 12 has a first section 12a and a second section 12b welded, as at 18, to the first section 12a. The first section 12a of the housing 12 has an axial hole 20 in which a rod lens 22 is inserted in place, and a substantially cylindrical recess or cavity 24 connected to the axial hole 20. The laser holder 14 has one end 14a received in the cavity 24 and laser welded, as at 26, to the first section 12a of the housing 12. A laser assembly is generally indicated by the reference numeral 30 and includes a stem 32 substantially in the form of a disk, and a semiconductor chip 34 encased by a cap 36 which is, in turn, attached to the stem 32. A plurality of lead terminals 38 are connected to the stem 34 to apply an electric current to the semiconductor chip 32. A large diameter bore 14b is formed in one end of the laser holder 14 to receive the stem 32 of the laser assembly 30. Also, a small diameter bore 14c is formed in the other end of the laser holder 14 to receive the cap 36 of the laser assembly 30. The two bores 14b and 14c are connected by a step 14d. The stem 32 of the laser assembly 30 is secured, as at 39, to the step 14d of the laser holder 14 by resistance welding.

The second section 12b of the housing has a threaded end 40 with which the fiber holder 16 is threadingly engaged. The fiber holder 16 is generally cylindrical and includes an axially extending ferrule 42 by which an optical fiber 44 is held. In the illustrated embodiment, the optical package or module 10 is designed for a high frequency, single mode transmission system. The second section 12b of the housing has an axially extending large diameter bore 45 configured to receive the ferrule 42, and an axially extending small diameter bore 46 through which the large diameter bore 45 is connected to the axial hole 20 of the first section 12a of the housing.

The semiconductor laser emits light in response to an applied current. The rod lens 22 is adapted to focus optical emission from the laser 34 to the optical fiber 44 through the bores 20, 46 and 45. The optical fiber 44 then transmits the optical emmission of the semiconductor laser 34 externally of the optical package 10.

Figure 2:
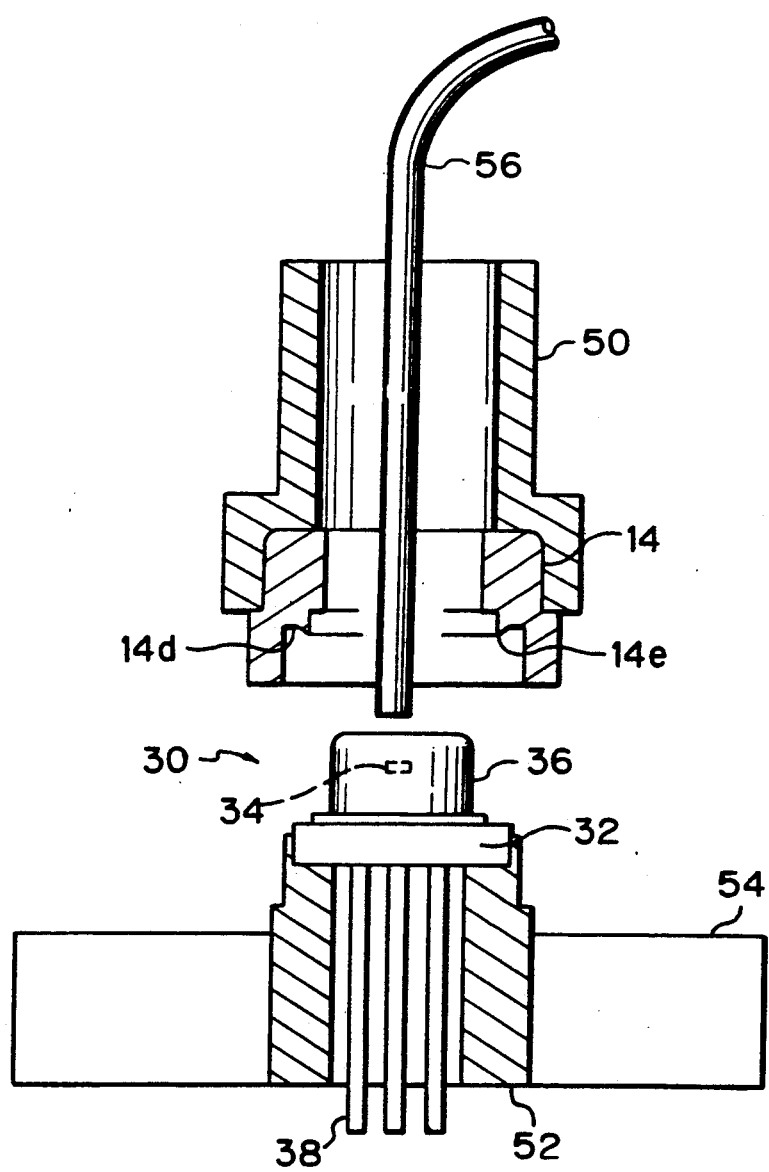
FIG. 2 is a schematic view showing the manner in which a semiconductor laser is aligned within a laser holder.

In the illustrated embodiment, the optical package 10 is fabricated as follows. First, the laser assembly 30 is attached to the laser holder 14. With reference specifically to FIG. 2, a resistance welding machine includes an upper electrode 50 and a lower electrode 52. The laser assembly 30 is attached to the lower electrode 52 which is, in turn, mounted to an adjusting table 54. The adjusting table 54 is movable in a radial direction relative to the optical axis of the semiconductor laser. The laser holder 14 is attached to the upper electrode 50. A monitor optical fiber 56 is positioned in the upper electrode 50 and extends along the central axis of the laser holder 14 or the optical axis of the optical fiber 44. The adjusting table 54 is, then, moved to align the optical axis of the semiconductor chip 34 with the central axis of the laser holder 14 or the optical axis of the monitor optical fiber 56. In one alignment procedure, a video system is used. When the semiconductor laser is activated, optical emission from the semiconductor laser is viewed on the screen. Alternatively, a microscope may be used to directly view the monitor optical fiber 56. The upper electrode 50 is thereafter lowered to move the laser holder 14 toward the laser assembly 30. An annular projection 14e extends from the step 14d of the laser holder 14. When the annular projection 14e is pressed against one side of the disk or stem 32 of the laser assembly 30, voltage is applied to secure the laser assembly 30 to the laser holder 14 by resistance welding. The rod lens 22 is soldered or otherwise secured in place. The laser holder 14 is then inserted into the cavity 24 of the first section 12a of the housing until the required spacing, typically less than 5 μm, between the semiconductor laser 34 and the rod lens 22 is achieved.

Laser welding is used, as at 26, to fix the laser holder 14 in place. Finally, the second section 12b is moved in a radial direction relative to the optical axis of the laser to maximize output and is then welded, as at 18, to the first section 12a of the housing 12.

Figure 3:
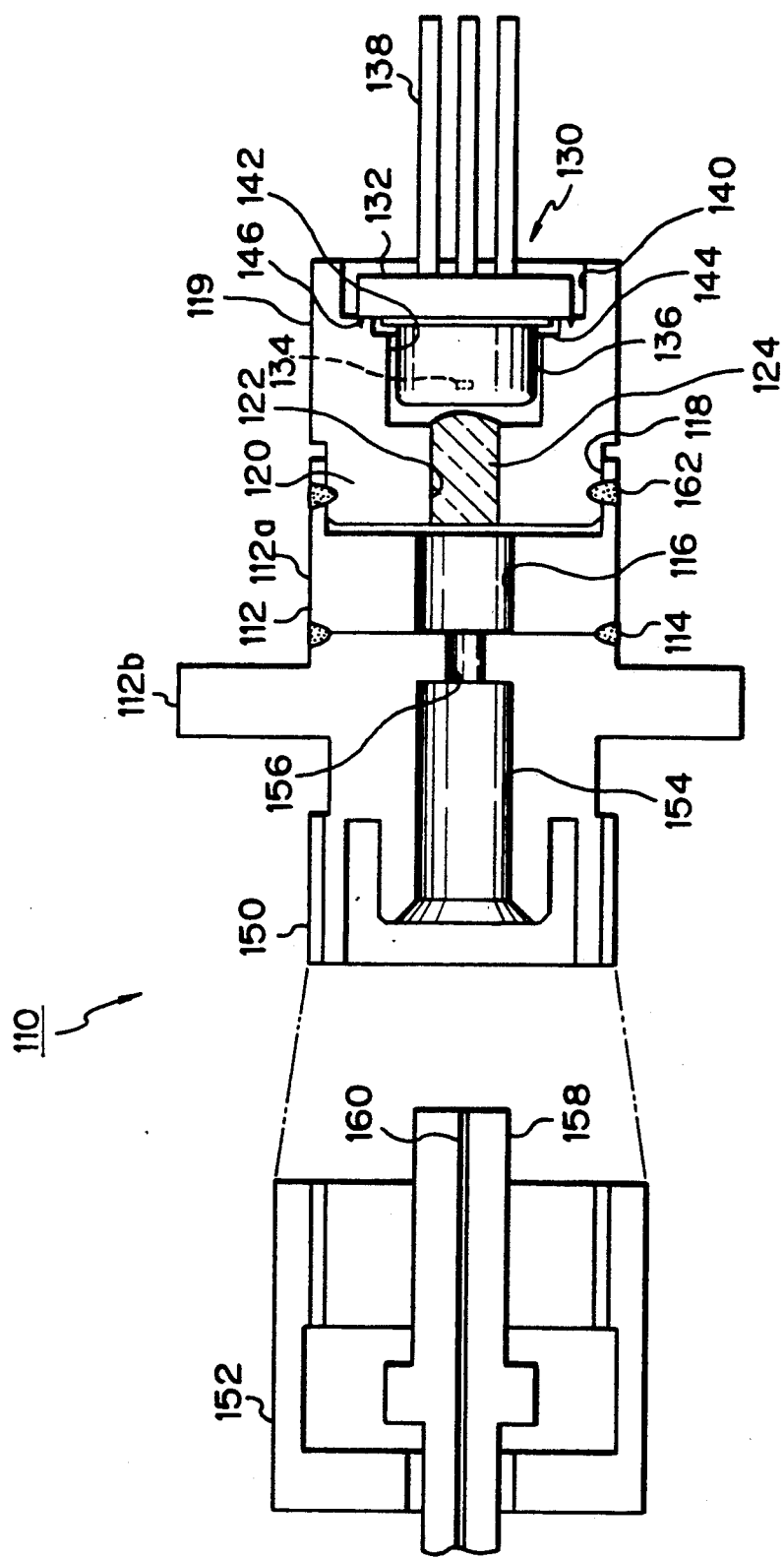
FIG. 3 is a longitudinal sectional view of an optical package fabricated according to another embodiment of the invention.

With reference to FIG. 3, there is shown an optical package fabricated according to another embodiment of the present invention and generally indicated by the reference numeral 110. The optical package 110 includes a housing 112 which is composed of a first section 112a and a second section 112b laser welded together as at 114. The first section 112a of the housing 112 has an axial bore 116 and a cavity 118.

A laser holder 119 is generally cylindrical and has one end 120 slidably received in the cavity 118 and laser welded to the housing 110. The laser holder 119 has an axial bore 122 into which a rod lens 124 is soldered in place. A laser assembly 130 includes a stem 132 substantially in the form of a disk, a semiconductor chip 134 encased by a cap 136 which is, in turn, attached to the stem 132. A plurality of lead terminals 138 are connected to the stem 132 to apply a current to the semiconductor chip 134. A large diameter bore 140 and a small diameter bore 142 are formed in the laser holder 119 to receive the stem 132 and the cap 136 of the laser assembly 130, respectively. The two bores 140 and 142 are connected by a step 144. The step 144 has an annular projection to which one side of the stem 132 is welded as at 146.

The second section 112b of the housing 112 has one end laser welded, as at 114, to the first section 112a and the other, threaded end 150 with which a fiber holder 152 is threadingly engaged. The second section 112b of the housing also has an axially extending large diameter bore 154 and an axially extending small diameter bore 156 through which the large diameter bore 154 is connected to the axial hole 116. The fiber holder 152 has an axially extending ferrule 158 by which an optical fiber 160 is held. When the fiber holder 152 is secured onto the second section 112b of the housing, the ferrule 158 is received within the large diameter bore 154.

In assembly, the laser assembly 130 is first assembled to the laser holder 119 in the same manner as in the previous embodiment. In this case, the monitor optical fiber extends through the axial bore 122 of the laser holder 119. The rod lens 124 is then inserted into the axial bore 122 of the laser holder 119 until a predetermined spacing between the rod lens 124 and the semiconductor laser is attained. The rod lens 124 is, thereafter, soldered in place. The laser holder 119 is thereafter inserted into the cavity 118 of the first section 112a of the housing 112. After axial alignment has been completed, laser welding is used, as at 162, to fix the laser holder 119 in place. Finally, the second section 112b of the housing 112 is moved in a radial direction relative to the optical axis of the semiconductor laser until the light output is optimized and is then laser welded, as at 114, to the first section 112a of the housing.

It is also understood that even though several characteristics and advantages of the present invention have been set forth in the foregoing description, together with details of the structure and function of the invention, the disclosure is illustrative only. Accordingly, changes may be made in detail, especially in matters of shape, size and arrangement of parts within the scope of the invention.

What is claimed is:

1. A method of fabricating an optical package, said package including a housing having a first section and a second section connectable to said first section, a first holder adapted to hold an optical semiconductor element. and a second holder connected to said second section of the housing and adapted to hold an optical fiber, said first section of the housing including a cavity configured to slidably receive said first holder, and an axially extending bore into which a rod lens is inserted to focus optical emission from said optical semiconductor element on said optical fiber, said method comprising the steps of:

(a) moving said optical semiconductor element relative to said first holder in a radial direction relative to an optical axis of said optical fiber so as to align an optical axis of said optical semiconductor element with a central axis of said first holder;

(b) fixing said optical semiconductor element to the first holder;

(c) moving said first holder within said cavity along the optical axis of said optical fiber so as to attain a predetermined spacing between said optical semiconductor element and said rod lens;

(d) fixing said first holder to said first section of the housing;

(e) moving said second section of the housing relative to said first section of the housing in a radial direction relative to the optical axis of said optical fiber until light output is maximized; and (f) securing said first section and said second section of the housing together.

2. The method of claim 1, wherein said optical semiconductor element is fixed to said first holder by resistance welding.

3. The method of claim 1, wherein said first holder is fixed to said first section of the housing by laser welding.

4. The method of claim 1, wherein said first section and said second section of the housing are secured together by laser welding.

5. A method of fabricating an optical package, said optical package including a housing having a first section and a second section connectable to said first section, a first holder adapted to hold an optical semiconductor element, a second holder connected to said second section of the housing and adapted to hold an optical fiber, said first section of the housing including a cavity configured to slidably receive said first holder, and a rod lens positioned within said first holder to focus optical emission from said optical semiconductor element on said optical fiber, said method comprising the steps of:

(a) moving said optical semiconductor element relative to said first holder in a radial direction relative to all optical axis of said optical fiber so as to align an optical axis of said optical semiconductor element with a central axis of said first holder;

(b) fixing said optical semiconductor element to the first holder;

(c) axially moving said lens relative to said semiconductor element until a predetermined spacing therebetween is attained;

(d) inserting said first holder into said cavity;

(e) fixing said first holder to said first section of the housing;

(f) moving said second section of the housing relative to said first section of the housing in a radial direction relative to the optical axis of said optical fiber until light output is maximized; and (g) securing said first section and said second section of the housing together.

6. The method of claim 5, wherein said optical semiconductor element is fixed to said first holder by resistance welding.

7. The method of claim 5, wherein said first holder is fixed to said first section of the housing by laser welding.

8. The method of claim 5, wherein said first section and said second section of the housing are secured together by laser welding.

9. An optical package having an optical semiconductor element and an optical fiber, said package comprising:

a first holder for holding said semiconductor element;
a second holder for holding said optical fiber;
a housing having a first section and a second section connected to said first section;
said second holder connected to said second section of the housing;
said first section including means connected in a fitting engagement to said first holder; and
a rod lens;
said first holder having means for supporting said rod lens therein so as to focus optical emission from said optical semiconductor element on said optical fiber.

10. An optical package as set forth in claim 9, further comprising:

first and second weld means;
said first weld means providing retention of said first holder and first section of said housing in said fitting engagement;
said second weld means formed at the connection of the first and second sections of the housing.

11. An optical package as set forth in claim 10 wherein said first holder and said housing are formed with substantially like diameter outer cylindrical walls.

12. An optical package as set forth in claim 11 wherein a junction plane is defined at the abutment between facing walls of said first section and said second section of the housing, said junction plane disposed along a plane substantially perpendicular to the optical axis of the optical fiber.

13. An optical package having an optical semiconductor element and an optical fiber, said package comprising:

a first holder for holding said semiconductor element;
a second holder for holding said optical fiber;
a housing having a first section and a second section;
means for connecting said first and second sections in axial alignment;
said second holder connected to said second section of the housing;
said first section including means connected in a fitting engagement to said first holder; and
a rod lens;
said first holder having means for supporting said rod lens therein so as to focus optical emission from said optical semiconductor element on said optical fiber.

14. An optical package having an optical semiconductor element and an optical fiber, said package comprising:

a first holder for holding said semiconductor element;
a second holder for holding said optical fiber;

a housing having a first section and a second section connected to said first section;

said second holder ocnnected to said second section of the housing;

means for connecting said first section to said first holder in axial fitting engagement therebetween; and a rod lens;

said first holder having means for supporting said rod lens therein so as to focus optical emission from said optical semiconductor element on said optical fiber.

* * * * *